Patented May 1, 1928.

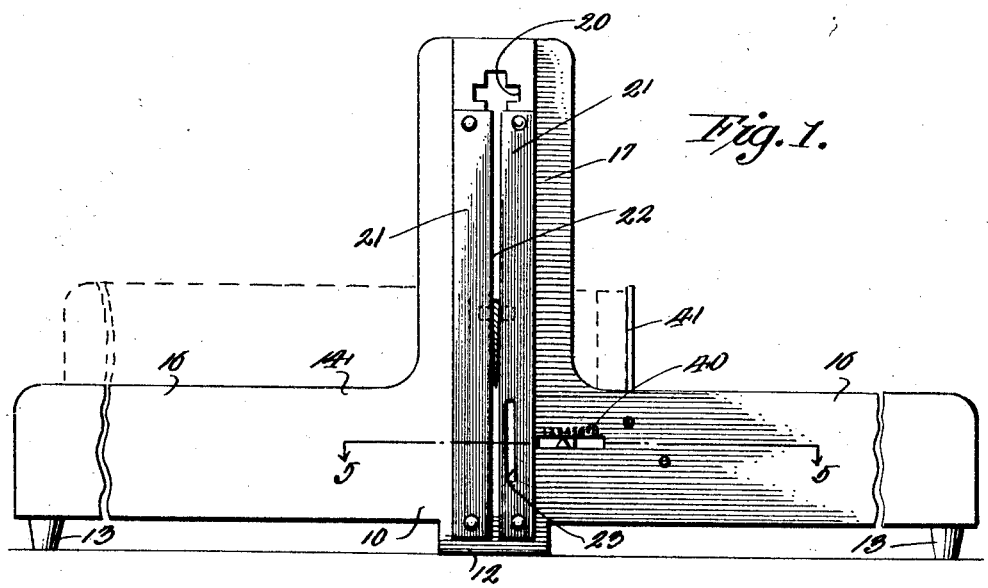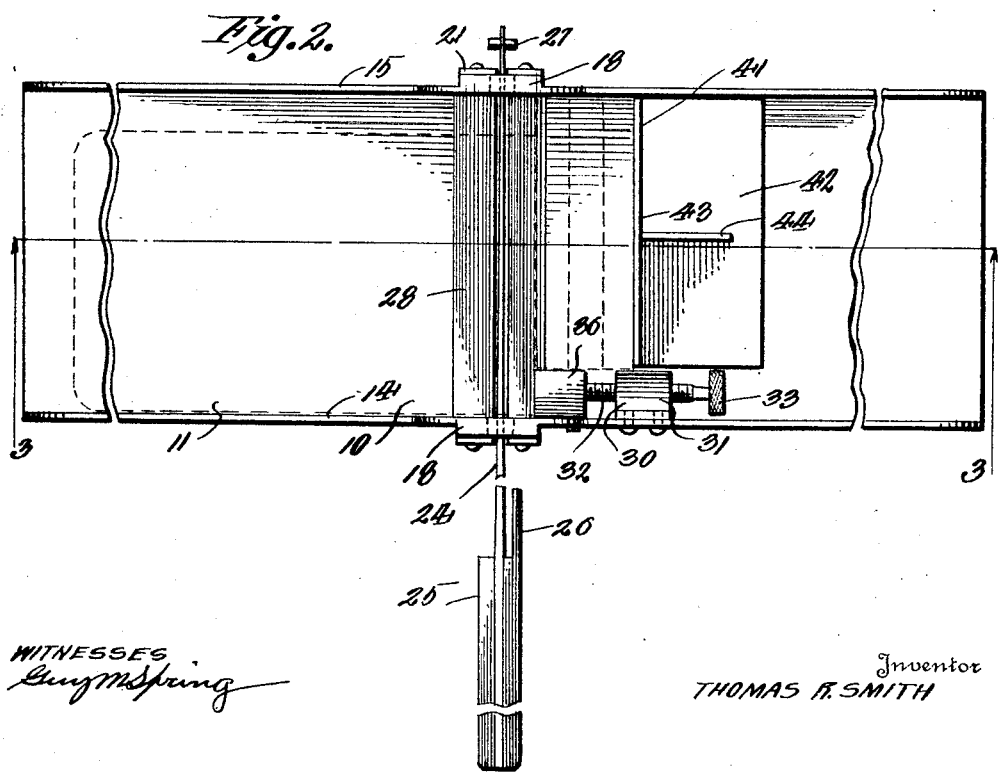

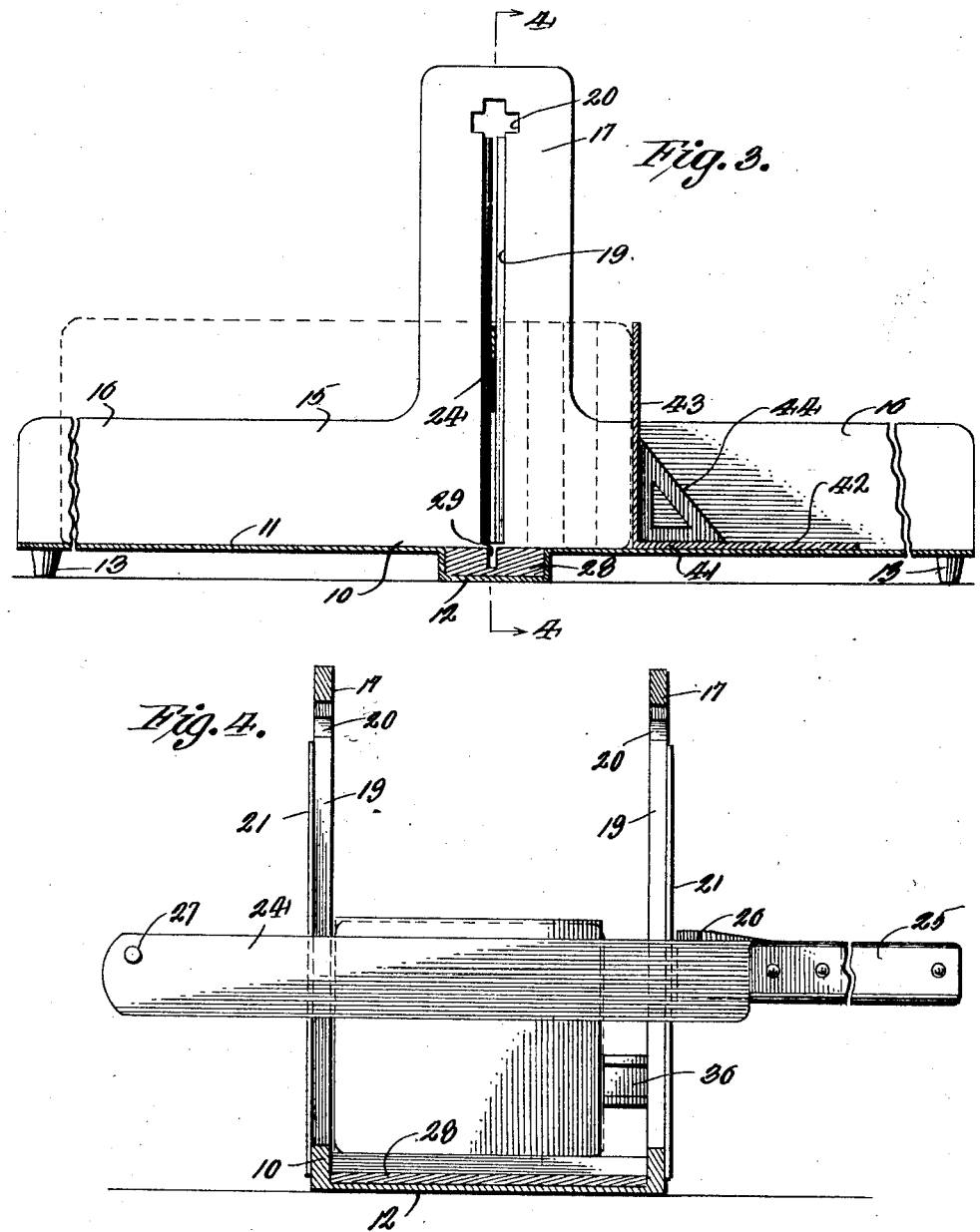

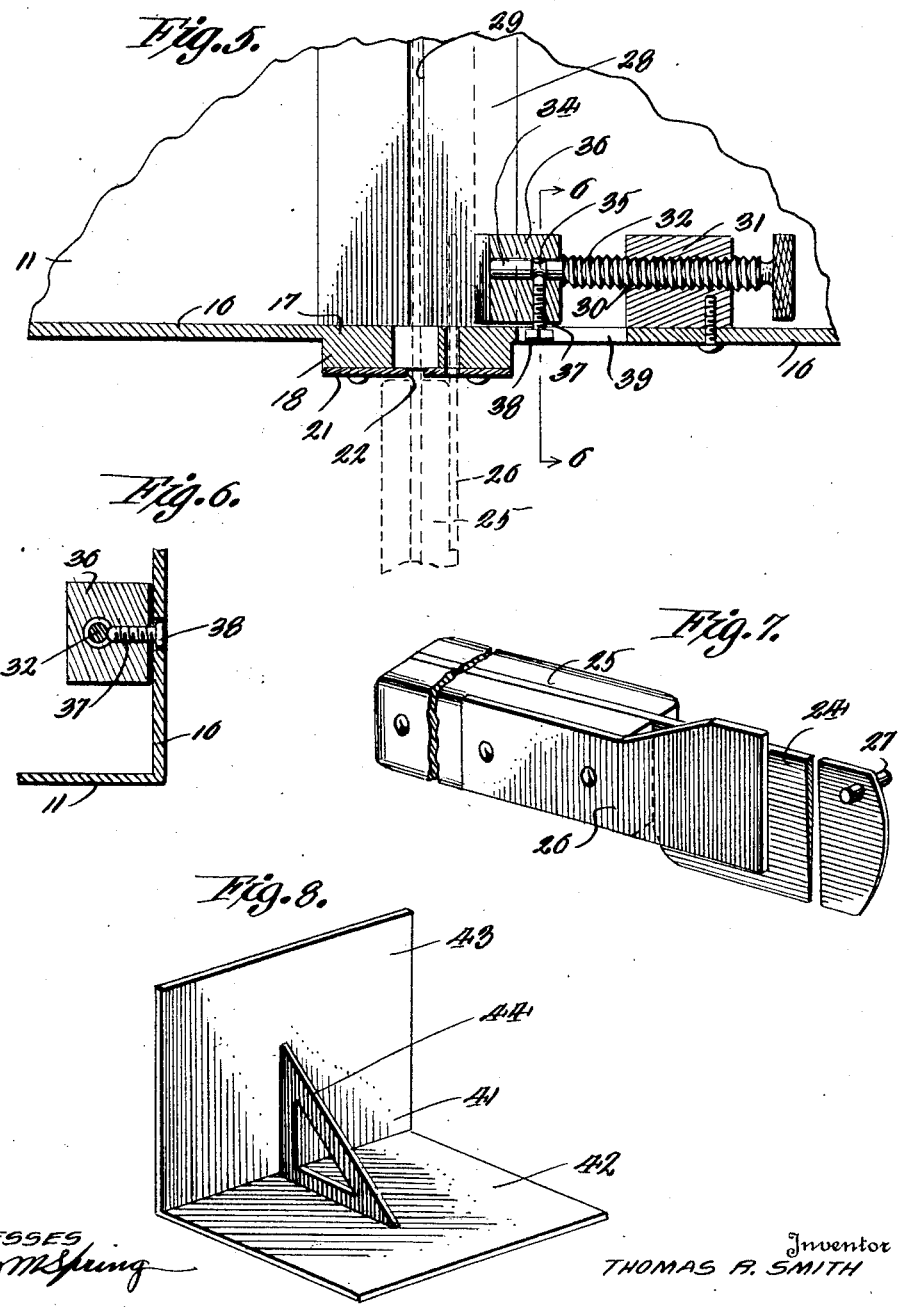

1,667,994

UNITED STATES PATENT OFFICE.

THOMAS R. SMITH, OF CHICAGO, ILLINOIS.

BREAD SLICER.

Application filed December 30, 1926. Serial No. 158,031.

The present invention relates to improvements in slicing apparatus and has for its primary object to provide a simple and efficient bread slicing device which can be placed upon the market at a relatively low cost.

Another object of the invention is the provision of a bread slicing apparatus by the use of which a loaf of bread may be readily and quickly cut in slices of uniform thickness.

Another object of the invention is the provision of a bread slicing apparatus which may be adjusted so that the thickness of the slices may be varied.

Still another object of the invention is the provision of a bread slicing apparatus of the above type which will be convenient in use and durable of construction.

Other objects and advantages of the invention will become apparent as the description progresses.

In the accompanying drawings forming a part of this specification and in which like reference characters are employed to designate corresponding parts throughout the same:

Figure 1 is a front elevational view of a bread slicing apparatus constructed in accordance with my invention, Figure 2 is a top plan view of the same, Figure 3 is a vertical longitudinal sectional view taken on the line 3—3 of Figure 2, Figure 4 is a vertical transverse sectional view through the center of the device, taken on the line 4—4 of Figure 3, Figure 5 is an enlarged horizontal sectional view taken on the line 5—5 of Figure 1, Figure 6 is a vertical transverse sectional view taken on the line 6—6 of Figure 5, Figure 7 is a fragmentary perspective view of the cutting knife, and Figure 8 is a perspective view of a movable slice supporting member.

Referring to the drawings, wherein for the purpose of illustration is shown the preferred embodiment of my invention, the numeral 10 generally designates the frame of the slicer, embodying an oblong bottom plate 11 of rectangular formation formed at its center with a transversely extending channel 12 projecting downwardly from the plane of the plate and adapted to rest upon a table. The lower side of the bottom plate also carries short tapered legs 13 at its corners, the lower ends thereof terminating in a horizontal plane with the bottom of the channel 12 to firmly support the frame on a table.

Formed integral with the bottom plate 11 and extending vertically upward therefrom are complementary front and rear frame plates 14 and 15 respectively, these plates embodying rectangular longitudinally extending loaf guiding extensions 16 and vertically projecting central knife guides 17 arranged transversely of the frame and parallel to each other. The central portions of the vertical knife guides 17 are formed on their outer faces with longitudinally extending re-inforcing ribs 18 extending the entire height of the guides. Longitudinal guide slots 19 are formed in the centers of the loaf guides 17, the side walls of the slots near their upper ends being formed with extending recesses 20 the purpose of which will later appear. The frame structure above described is preferably cast from aluminum or other light metal to provide a light and durable structure which may be conveniently handled.

Detachably secured to the outer side of the loaf guide ribs 18 are vertically extending strips 21 arranged in oppositely disposed pairs projecting partially over the slots 19 formed in the loaf guides to form restricted guide slots 22. One of the strips 21 mounted on the forward frame plate is formed with a vertically extending slot 23 arranged adjacent the main longitudinal slot and adjacent the lower end of the frame.

Formed for transverse reciprocating movement through the guide slots 22 is a knife blade 24 having its lower edge sharpened to form a cutting edge and carrying a handle 25 at its forward end. Rigidly secured to one side of the handle 25 and extending rearwardly thereof is a slice displacing blade 26 extending parallel with the knife blade and spaced therefrom. The forward end of the slice displacing blade 26 is adapted for projection through the slot 23 for effecting displacement of the slices as will presently be described. The forward end of the knife blade 24 carries a transversely extending pin 27 projecting laterally from the blade. This pin is arranged so as to be readily passed through the transverse recesses 20 for insertion of the knife blade through the guide slots 22. Secured in the transversely directed channel 12 of the frame and having its upper surface arranged flush with the upper surface of the bottom plate 11 is a longitudinal block 28 of rectangular cross section formed of wood or similar material and provided with a central groove 29 arranged in a vertical plane with the guide slots of the frame. This block is designed to be engaged by the cutting edge of the knife upon completion of the slicing stroke.

In order that slices of different thickness may be cut by the apparatus, an adjustable stop device 30 is mounted on the frame, this device being positioned on the forward frame plate adjacent the knife guide. This adjusting device embodies a rectangular bearing block 31 rigidly secured at the inner side of the front frame plate and formed with an interiorly screw threaded bore. Threaded through the bore in the bearing block is a screw 32 formed with a knurled head 33 at one end for convenient manipulation of the screw. The other end of the screw 32 is formed with a cylindrical shank 34 provided with an annular groove 35. The shank 34 is rotatably mounted in a cylindrical bore formed in a stop block 36 of rectangular formation longitudinally adjustable by the screw across the front frame plate. Threaded transversely through the stop block 36 and having its inner end projecting into the groove 35 in the shank 34 is an indicator element comprising a screw 37 having a triangular head 38 formed on its outer end. This head is movable longitudinally in a horizontal slot 39 formed in the front frame plate and has its base resting upon the lower wall of the slot and its apex presented at the upper wall of the slot to register with scale marks 40 upon the face of the plate above the slot 39 to indicate various adjustments of the stop device. From this construction it is obvious that by rotating the screw 32, the stop block 36 is adjusted horizontally toward or away from the blade guide of the frame. When the block is adjusted to its innermost position adjacent the knife guide structure a slice of minimum thickness will be cut, and when the block is adjusted to a position more remote from the knife guide structure the slices will be of increased thickness.

Mounted for sliding movement on the bottom plate 11 of the frame and arranged to support the slices of bread in compact vertical position is a slice supporting abutment 41 embodying a horizontal rectangular bottom plate 42 and a vertical plate 43 arranged in right angular position with respect to the bottom plate and engageable with the sliced bread. The plate 43 is braced by a triangular bracing member 44.

As clearly indicated in Figures 1 and 2, the frame 10 is constructed wider than the standard loaf of bread and the loaf is initially positioned in the left hand side of the frame against the forward plate. The cutting blade 24 is raised in the knife guiding structure to a position above the loaf and the loaf is shifted laterally to position against the stop block 36. The knife is then lowered and reciprocated with a cutting motion to sever the first slice from the loaf. As the knife blade descends and completes the last cutting stroke the slice displacing blade 26 of the knife will project through the slot 23 in the forward frame plate and push the slice toward the rear frame plate so that the slice will clear the stop block of the adjusting device. The slice will be held vertically in displaced position by means of the abutment 41. As the operation is repeated, the loaf is fed laterally and the slices simultaneously moved together with the abutment and when the entire loaf, or a desired portion thereof has been properly sliced the abutment 41 is removed and the slices removed from the frame. In this manner, the loaf is rapidly cut to form a plurality of slices of uniform thickness.

When it is desired to vary the thickness of the slices the screw 31 is adjusted by rotating the head 33 to slidably actuate the stop block 36 and vary the limit of feeding movement of the loaf. Thus, a compact and durable slicing apparatus is produced capable of being operated to quickly and conveniently slice a loaf of bread of any shape or size.

It is to be understood that the form of my invention herewith shown and described is to be taken as the preferred example of the same and that various changes as to the shape, size and arrangement of parts may be resorted to without departing from the spirit of the invention or the scope of the subjoined claims.

Having thus described my invention, I claim:

1. A bread slicer comprising a longitudinal loaf guide, a pair of oppositely disposed knife guides carried by the loaf guide, a knife including a blade guided for reciprocating movement in the knife guides, a handle secured to one end of the blade, a slice displacing blade secured to one side of the knife arranged to enter the loaf guide to displace the cut slices in offset position in the guide, and a slidable abutment adapted to support the slices in upright displaced position.

2. A bread slicer comprising a longitudinal loaf guide, vertically extending knife guides located at the front and rear of the loaf guide and formed with vertical guide slots, a knife having its blade projecting through the guide slots and guided for reciprocating movement to cut vertically through the loaf, a slice engaging blade secured to the knife and arranged in a position parallel with the cutting blade to be projected into the loaf guide to displace the cut slices in offset position with respect to the loaf, and an adjustable stop mounted in the loaf guide adapted to limit the feeding movement of the loaf and determine the thickness of the slices.

3. A bread slicer comprising a longitudinal loaf guide including a bottom plate and vertical front and rear plates, vertical knife guides located at the intermediate portion of the front and rear plates and provided with vertical guide slots, a longitudinally adjustable stop mounted in the loaf guide to limit the feeding movement of the loaf to vary the thickness of the slices, a knife having a blade extended through the knife guides' slots and arranged for reciprocating movement to cut through the loaf, and a slice displacing blade secured to the knife and arranged parallel with the cutting blade and adapted to project through a slot in the front frame plate in the lowermost position of the knife to displace the slices, as they are cut, in offset position with respect to the stop.

4. A bread slicing machine comprising a loaf guide, a stop within the guide, blade guiding means in operative relation to the loaf guide, a blade guided by said means for slicing movement, and means carried by the blade for engaging and displacing the slices as they are cut, whereby the slices may be fed past the said stop.

5. A bread slicing machine comprising a loaf guide, blade guiding means in operative relation to the loaf guide, a blade guided by said means for slicing movement, and means carried by the blade for engaging and displacing the slices as they are cut.

THOMAS R. SMITH.